United States Patent [19]
Robinson

[11] 3,726,538
[45] Apr. 10, 1973

[54] TEMPORARY TRAILER RUNNING GEAR

[75] Inventor: John D. Robinson, Texas City, Tex.

[73] Assignee: Rebecca P. Robinson, Texas City, Tex. ; a part interest

[22] Filed: Feb. 9, 1971

[21] Appl. No.: 113,869

[52] U.S. Cl. ..............................280/81 R, 280/124 R
[51] Int. Cl. .................................................B60g 5/00
[58] Field of Search............280/81 R, 80 B, 104.5 R, 280/104.5 B, 30; 296/23 R

[56] References Cited

UNITED STATES PATENTS

| | | | |
|---|---|---|---|
| 1,621,555 | 3/1927 | Miller | 280/80 B |
| 3,140,879 | 7/1964 | Schaefer | 280/81 R |
| 2,268,167 | 12/1941 | Raine | 280/81 R X |
| 2,682,419 | 6/1954 | Wolf | 280/80 B X |
| 2,839,311 | 6/1958 | Locker | 280/80 B |
| 3,254,914 | 6/1966 | Steck | 280/81 R X |
| 3,332,699 | 7/1967 | Devys | 280/81 R |
| 3,239,274 | 3/1966 | Weiss | 280/81 R X |

Primary Examiner—Kenneth H. Betts
Attorney—Clarence A. O'Brien and Harvey B. Jacobson

[57] ABSTRACT

A removable running gear assembly for securement to the underframe of modular structures to be transported over roads. The assembly includes tandem axles provided with conventional opposite end leaf springs and the adjacent ends of each pair of leaf springs are anchored by spring shackles to a center mounting plate while the remote ends of each pair of leaf springs are anchored by shackles to opposite end mounting plates thus providing three mounting plates along opposite sides of the tandem axle assembly for securement to corresponding longitudinal members of a support frame upon which a modular structure is disposed.

4 Claims, 5 Drawing Figures

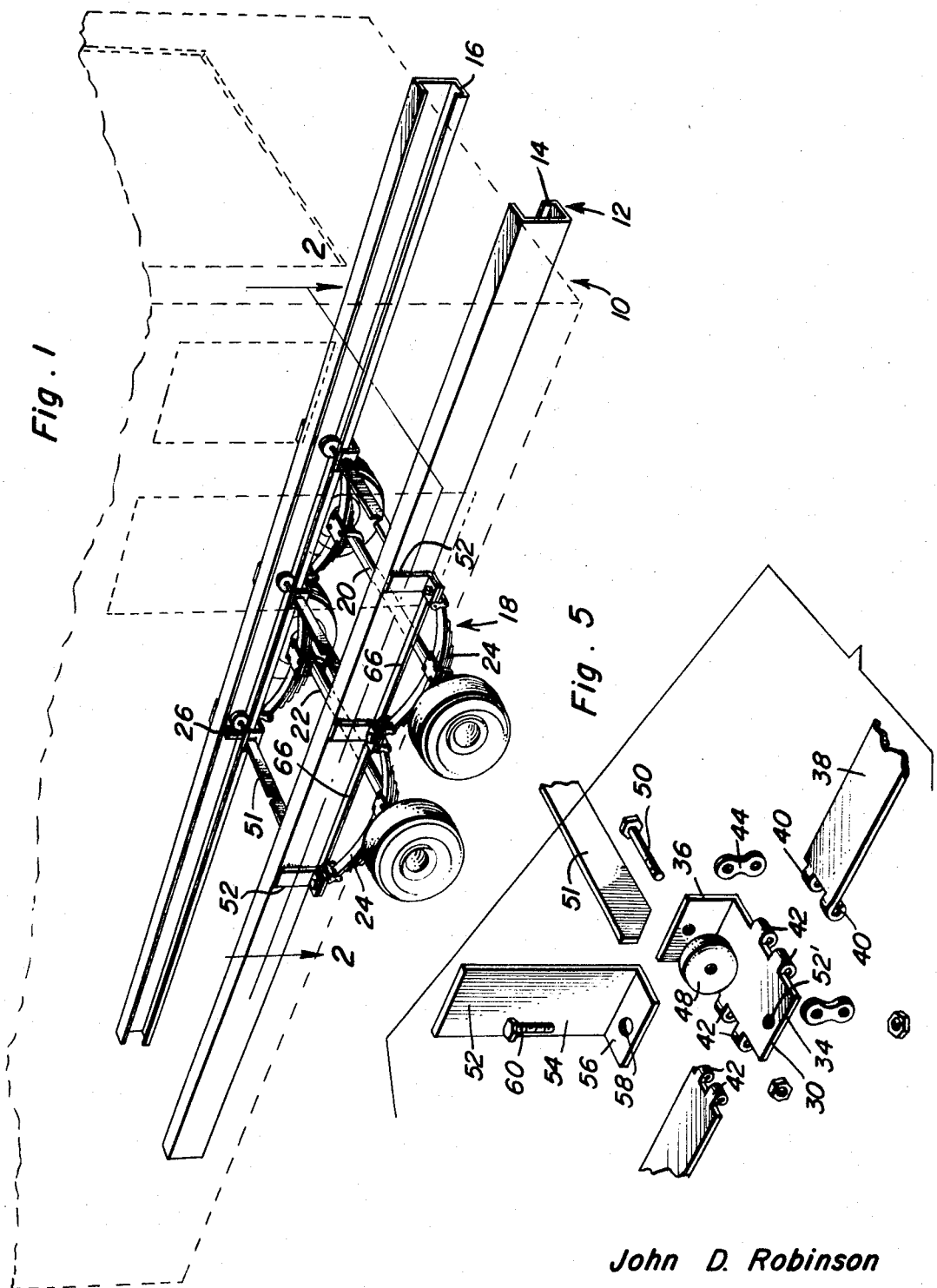

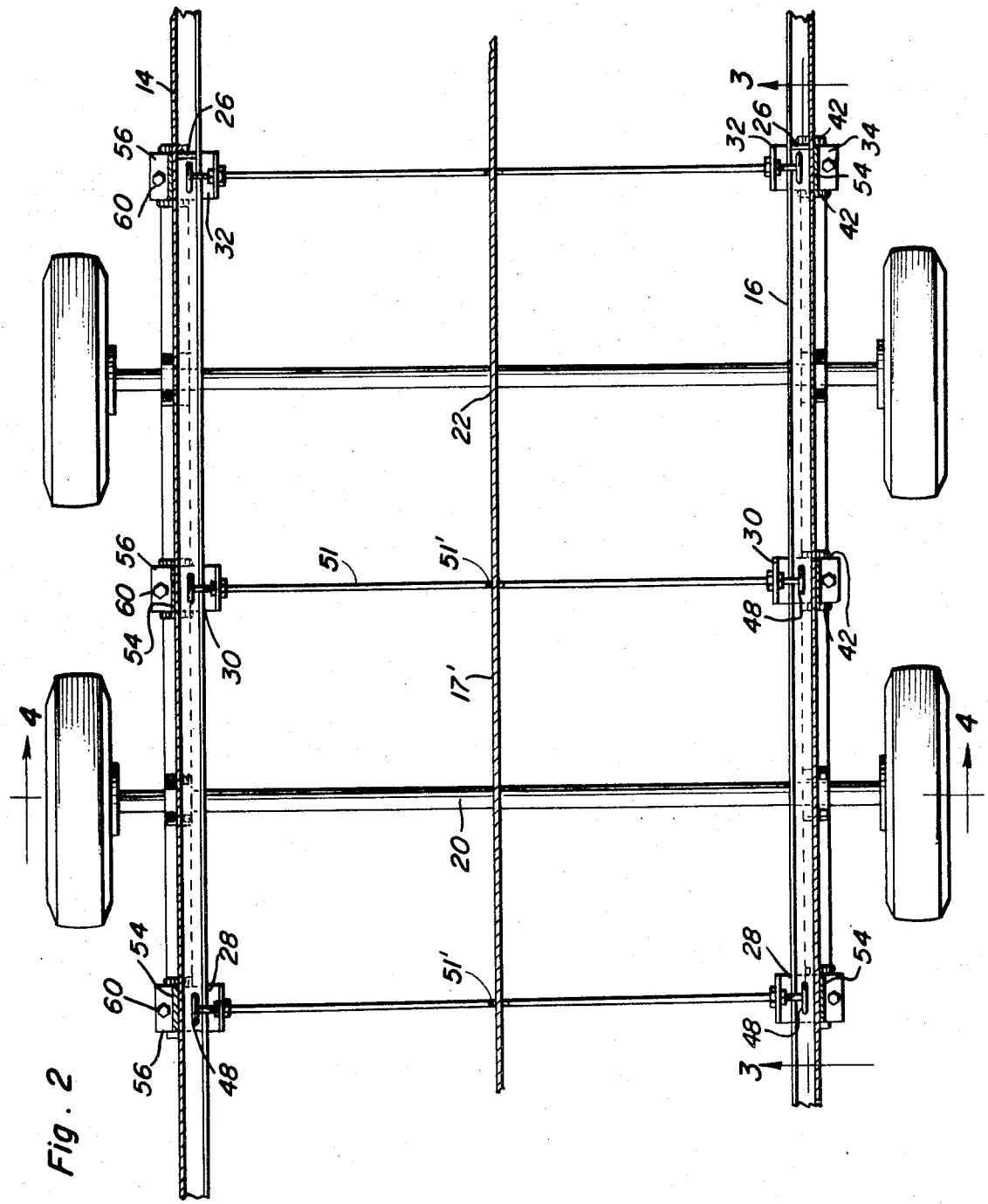

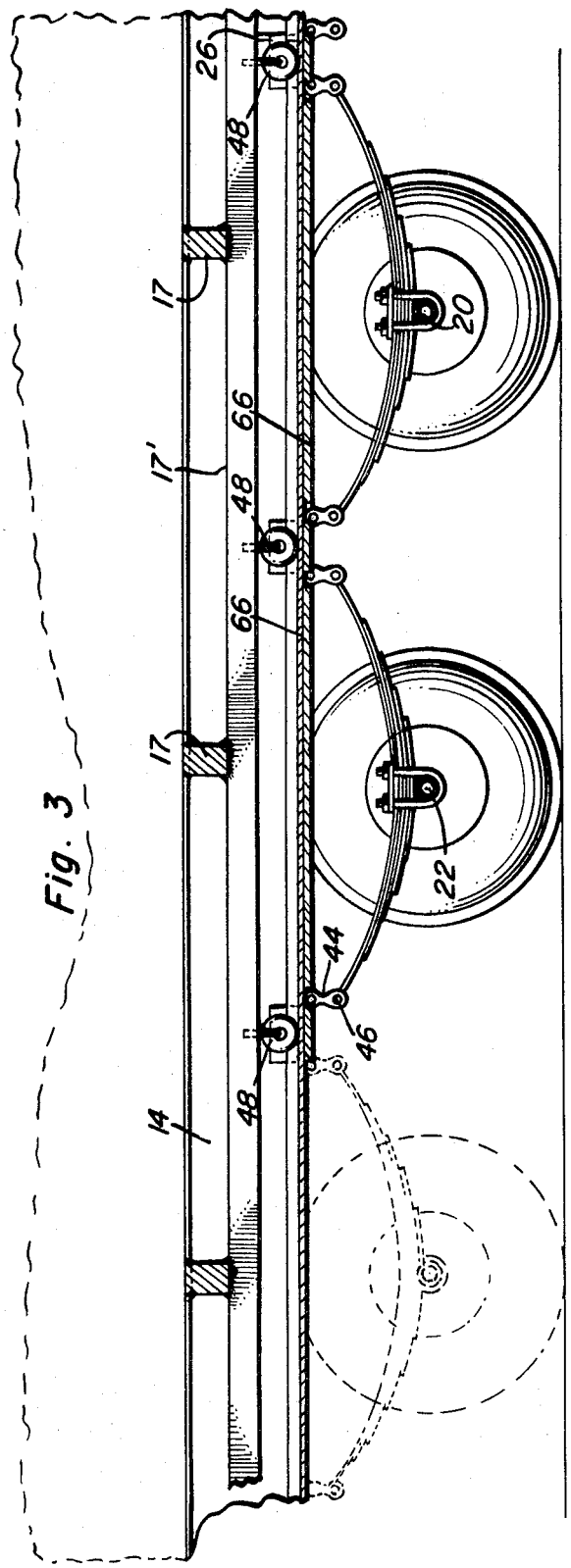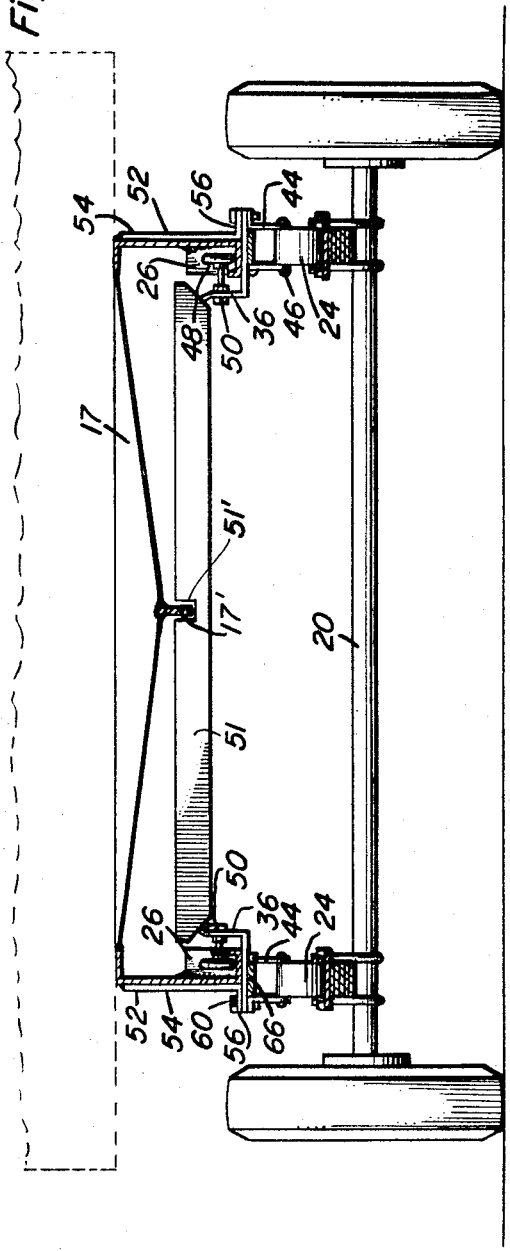
John D. Robinson
INVENTOR.

TEMPORARY TRAILER RUNNING GEAR

The running gear assembly of the instant invention has been specifically designed for use beneath house trailer frames although it is to be understood that the running gear assembly may also be utilized for supporting other modular structures.

Conventional house trailers are presently marketed with their own running gear assemblies although a large majority of house trailers or mobile homes are merely transported from the site of purchase to a remote site of use in which they may remain stationary for a number of years. Accordingly, the conventional running gear assemblies sold with mobile homes or house trailers may not be used other than to initially transport the mobile home to its site of use. Further, if at some future date it is desirable to move a mobile home to a second semi-permanent site, the original running gear must be carefully inspected and repaired or overhauled prior to movement of the mobile home to its second semi-permanent site to insure that the heavy load represented by the mobile home will not cause a malfunction of the running gear assembly during transit of the mobile home to its second site. This inspection and repair or overhaul can be quite expensive and it is accordingly the main object of this invention to provide a temporary running gear assembly which may be utilized in conjunction with a mobile home sold without its own running gear in order to transport the mobile home to its first semi-permanent site.

Another object of this invention is to provide a temporary running gear which may be maintained available by mobile home movers for subsequent reattachment to a mobile home located at its first semi-permanent site in order to transport the mobile home to a second semi-permanent site. In this manner a person purchasing a mobile home need only rent the running gear for a sufficient period of time to transport his mobile home to its first semi-permanent site and subsequently again rent the running gear assembly for any subsequent transit of the mobile home to other semi-permanent sites and it is proposed that rental fees for initial transport of a mobile home to its first semi-permanent site and a subsequent move to its second semi-permanent site would be far less than the additional cost of purchase of the mobile home with its own running gear assembly and inspection, repair and/or overhaul of a running gear assembly preparatory to transit of a mobile home to its second semi-permanent site.

A final object of this invention to be specifically enumerated herein is to provide a temporary running gear assembly in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of the longitudinal frame rails of a mobile home with the temporary running gear assembly of the instant invention operably mounted thereon;

FIG. 2 is an enlarged fragmentary horizontal sectional view taken substantially upon the plane indicated by the section line 2—2 of FIG. 1;

FIG. 3 is a fragmentary vertical sectional view taken substantially upon the plane indicated by the section line 3—3 of FIG. 2;

FIG. 4 is a fragmentary transverse vertical sectional view taken substantially upon the plane indicated by the section line 4—4 of FIG. 2; and FIG. 5 is a fragmentary exploded perspective view of one of the central mounting plates of the running gear assembly and related and adjacent components.

Referring now more specifically to the drawings the numeral 10 generally designates a mobile home including a main frame referred to in general by the reference numeral 12. The main frame 12 consists of a pair of opposite side longitudinal main frame beams 14 and 16 interconnected by means of transverse brace members 17 secured therebetween at points spaced longitudinally therealong and supporting a central longitudinal depending guide flange 17' therefrom, see FIGS. 2 through 4.

The temporary running gear assembly of the instant invention is referred to in general by the reference numeral 18 and includes a pair of axles 20 and 22 each provided with opposite end leaf springs 24.

The main longitudinal beams 14 and 16 are generally channel-shaped in cross-section, open toward each other and include abutment flanges 26 secured therein and the assembly 18 additionally includes opposite side sets of mounting plates 28, 30 and 32 which are generally L-shaped in configuration and include relatively angulated horizontal and upstanding flanges 34, 36. Each leaf spring 24 includes a main leaf spring 38 whose opposite ends are provided with axially aligned and spaced hinge barrels 40 and the opposite side marginal portions of each horizontal flange 34 includes pairs of similar axially spaced and aligned hinge barrels 42.

A pair of spring shackles 44 is provided for each end of each spring leaf 38 and suitable pivot fasteners 46 are utilized to secure the lower ends of each pair of spring shackles 44 to the corresponding spring leaf end and a similar pivot fastener 46 is utilized to secure the upper ends of each pair of spring shackles 44 to the corresponding horizontal flange portion 34.

By this connection between the axles 20 and 22 and the leaf springs 24, the axles 20 and 22 are connected together in an articulated manner whereby they may be readily folded for more compact storage.

A guide roller 48 is supported from each vertical flange portion 36 by means of an adjustable length defining fastener 50 and each horizontal flange 34 is apertured as at 52' and a transverse beam 51 extends between and is secured, by welding, to the upper portions of each pair of corresponding flanges 36 and includes a central upwardly opening notch 51' in which the guide flange 17' is guidingly received.

The main longitudinal beams 14 and 16 are modified by having three L-shaped mounting brackets 52 secured thereto at points spaced longitudinally therealong, three mounting brackets 52 to each beam. Each mounting bracket 52 includes an upstanding flange 54 which is welded or otherwise secured to the corresponding longitudinal beam and a horizontal flange 56 which is apertured as at 58. Each set of mounting plates 28, 30 and 32 has its horizontal flange portion 34 secured to the corresponding horizontal flange portion 56 by means of a bolt 60 removably secured through each pair of corresponding registered apertures 52 and 58 and the guide rollers 48 of the mounting plates 28, 30 and 32 rollingly engage the upper surfaces of the lower horizontal flange portions of the beams 14 and 16.

In operation, when it is desired to secure the running gear assembly 18 beneath the mobile home 10, the latter is suitably supported with its longitudinal beams 14 and 16 in elevated position and the mounting plates 28 are first engaged with the right hand ends of the beams 14 and 16 as seen in FIG. 1 with the horizontal flange portions of the mounting plates 28 underlying the lower horizontal flange portions of the beams 14 and 16 and the rollers 48 rollingly engage with the upper surface of the lower horizontal flange portions of the beams. Then, the mounting plates 28 are moved toward the abutment flanges 26 until the mounting plates 30 are registered with the right hand ends of the beams 14 and 16. Thereafter, the mounting plates 30 are engaged with the beams 14 and 16 in a like manner and the running gear assembly 18 is further shifted toward the abutment flanges 26 until the mounting plates 32 may be engaged with the right hand ends of the beams 14 and 16 in a similar manner. Thereafter, the running gear assembly 18 is shifted toward the abutment flanges 26 until the rollers 48 carried by the mounting plates 28 abut the flanges 26 at which point the apertures 58 will be registered with the corresponding apertures 52' and the bolts 60 may be passed through the apertures 52' and 58 in order to secure the mounting plates 28, 30 and 32 to the horizontal flange portions 56. At this point, the running gear assembly 18 is fully mounted beneath the mobile home 10 and the latter may be towed over the road to a remote site.

If it is desired to maintain the axles 20 and 22 as well as the leaf springs 24 in their proper positions relative to each other during installation of the running gear assembly 18 beneath the mobile home 10, a pair of bars 66 may be connected between each set of mounting plates 28, 30 and 32 whereby proper flexure of the leaf springs 24 may be maintained to achieve the proper spacing between the mounting plates 28, 30 and 32 preparatory to insertion of each bolt 60 through the corresponding registered apertures 52' and 58. After the running gear assembly 18 has been installed, the bars 66 may be removed, if desired.

However, after the mobile home has been transported to its next semi-permanent site, the running gear assembly 18 may be readily removed and retained by the firm from which it was rented.

It will of course be noted from the foregoing that the running gear assembly 18 could comprise only a single axle running gear assembly as well as include more than two axles. The only modifications required to the mobile home 10 is the securement of the mounting brackets 52 thereto at predetermined points spaced longitudinally along the beams 14 and 16. Of course, these mounting brackets may be readily secured to the mobile home 10 at a nominal cost.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

The foregoing is considered as illustrative only of the principles of the invention. Further, since numerous modifications and changes will readily occur to those skilled in the art, it is not desired to limit the invention to the exact construction and operation shown and describe, and accordingly all suitable modifications and equivalents may be resorted to, falling within the scope of the invention. provid9sssssssssss 1. In combination with a vehicle including predetermined mounting points spaced longitudinally along opposite sides thereof, a running gear assembly for mounting beneath said vehicle and including a transverse axle assembly provided with opposite end leaf springs including opposite end portions projecting forwardly and rearwardly from the front and rear sides of the axle assembly, a mounting plate for each spring end, means pivotally securing each plate to the corresponding leaf spring end, said mounting plates each including means for removable securement to a corresponding mounting point of said vehicle, said mounting points defining horizontal flange portions, said mounting plates including horizontal flanges for underlying and removable securement to said flange portions, said vehicle including opposite side longitudinal frame members, said flange portions being secured to and projecting horizontally laterally outwardly from said frame members, said flanges also including portions thereof underlying said frame member, said mounting plate each also including a support roller journalled therefrom and spaced above the last mentioned portions of said flanges for rolling engagement with the upper surfaces of said frame members.

2. The combination of claim 1 wherein said means pivotally securing each plate to the corresponding leaf spring end includes shackle means whereby said spring ends may shift slightly relative to said plates.

3. The combination of claim 1 wherein corresponding mounting plates are interconnected by means of a transverse member rigidly secured thereto and extending therebetween, said vehicle including a central depending longitudinal guide flange, the mid-portions of said transverse members including upwardly opening notches in which said guide flange is guidingly received.

4. The combination of claim 1 including an elongated rigid member connected between the mounting plates of each leaf spring whereby the latter may be maintained at least partially flexed and the spatial relationship between each pair of spring end mounting plates may be maintained for proper rigistry with said corresponding mounting points.

* * * * *